US005351731A

United States Patent [19]

Brandt et al.

[11] Patent Number: 5,351,731

[45] Date of Patent: Oct. 4, 1994

[54] MEANS FOR SAWING ELONGATE UNITS FROM A TREE TRUNK

[75] Inventors: Jerker Brandt; Lennart Hellberg, both of Karlstad, Sweden

[73] Assignee: Traform AB, Karlstad, Sweden

[21] Appl. No.: 50,062

[22] Filed: May 10, 1993

[30] Foreign Application Priority Data

Nov. 8, 1990 [SE] Sweden ............ 9003554-4

[51] Int. Cl.$^5$ ............ B27D 1/00; B32B 31/00

[52] U.S. Cl. ............ 144/352; 144/346; 144/348; 144/353; 144/364; 144/3 R; 156/250; 156/264; 156/331.1; 428/44; 428/114; 428/225

[58] Field of Search ............ 144/3 R, 345, 346, 348, 144/352, 353, 364, 367, 369, 378, 380; 156/94, 250, 254, 260, 264, 299, 304.1, 304.5, 331.1; 428/44, 58, 106, 114, 225, 535

[56] References Cited

U.S. PATENT DOCUMENTS

| | | | |
|---|---|---|---|
| 2,653,890 | 9/1953 | Dosker | 144/346 |
| 2,772,197 | 11/1956 | Kozdemba | 144/346 |
| 2,878,844 | 3/1959 | Anderson | 144/350 |
| 3,961,654 | 6/1976 | Hasenwinkle | 144/348 |
| 3,968,822 | 7/1976 | Ottosson et al. | 144/378 |
| 5,002,105 | 3/1991 | Bodig | 144/346 |
| 5,040,582 | 8/1991 | Hsu | 144/346 |
| 5,050,653 | 9/1991 | Brown | 144/350 |
| 5,135,597 | 8/1992 | Barker | 144/346 |
| 5,147,486 | 9/1992 | Hoffman | 144/346 |
| 5,240,050 | 8/1993 | Shing | 144/348 |

FOREIGN PATENT DOCUMENTS

| | | | |
|---|---|---|---|
| 997661 | 9/1976 | Canada | 144/347 |
| 621996 | 6/1961 | Italy | 144/347 |
| 434093 | 8/1935 | United Kingdom | 144/346 |

*Primary Examiner*—W. Donald Bray
*Attorney, Agent, or Firm*—Dennison, Meserole, Pollack & Scheiner

[57] ABSTRACT

The sequential forming of a wood product from lumber including the steps of and a system for sawing the lumber into lengths, sawing the lengths into elongate units, applying glue to the units and overlying the units in groups of at least two units to each group with the glue therebetween, stacking the groups, banding the stack of groups to preclude movement between the units in the groups, and drying the banded groups and curing the glue between the units in the individual groups.

16 Claims, 2 Drawing Sheets

MEANS FOR SAWING ELONGATE UNITS FROM A TREE TRUNK

The present invention relates to a means for sawing elongate units from a tree-trunk. These units may be substantially rectangular in cross section. It is known to join two elongate units by means of a glueing process to form a single product for use as studs, for instance. Such units have previously been produced from a dried trunk, with the result that when the units are subsequently stored they become deformed in various ways.

The object of the present invention is to avoid such changes in appearance. According to the invention this is achieved by means of an installation having a number of stations where in a first station a damp trunk is sawn up into lengths and the lengths are then split in a second station by means of sawing, where in a third station the units obtained are joined together in groups of at least two units by means of glueing, where in a fourth station the joined units are stacked in layers, where in a fifth station the stack formed is compressed and provided with peripheral strips to retain it in its compressed state, and where in a sixth station the stack is dried. During the process described an adhesive agent has been selected in which the glueing process is only completed when the stack clamped together is in the sixth station. The speed of transport from the glueing station to the drying station is so selected that said glueing process is only completed in the drying station.

When a tree-trunk is introduced into the installation described above it has a moisture degree of more than 30%. This only decreases in the drying station where the stack is deprived of its moisture content until the degree of moisture reaches approximately 10%. On entering the drying station, therefore, the glued units are elastic and, thanks to the retaining strips, the units can be held in their original shape, which is also retained after the glueing process is complete.

The glue chosen shall have such properties that the glueing process does not terminate until the glue is in the drying station. The glue is thus dependent on the transport time from glueing station to drying station. The glue is also dependent on moisture deprivation in the drying station.

The types of glue which can be used in the present installation are polyurethane glues.

Additional characteristics of the present invention are revealed in the appended claims.

Figure 1:
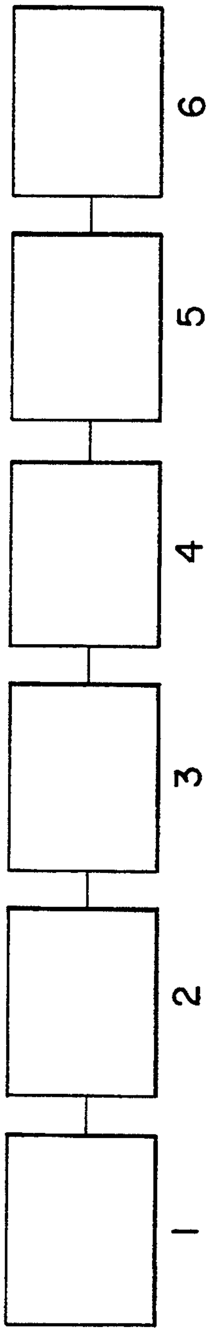
Figure 2:
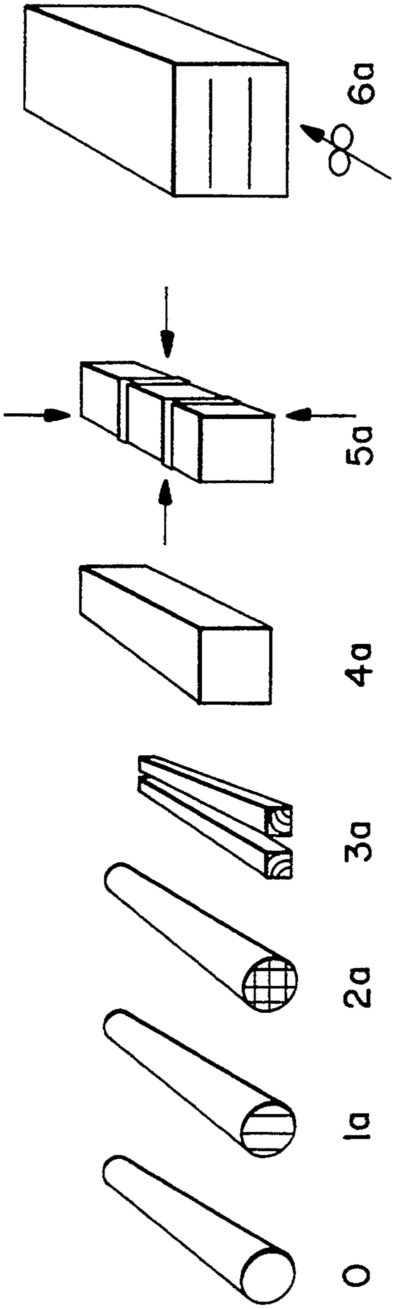
Figure 3:
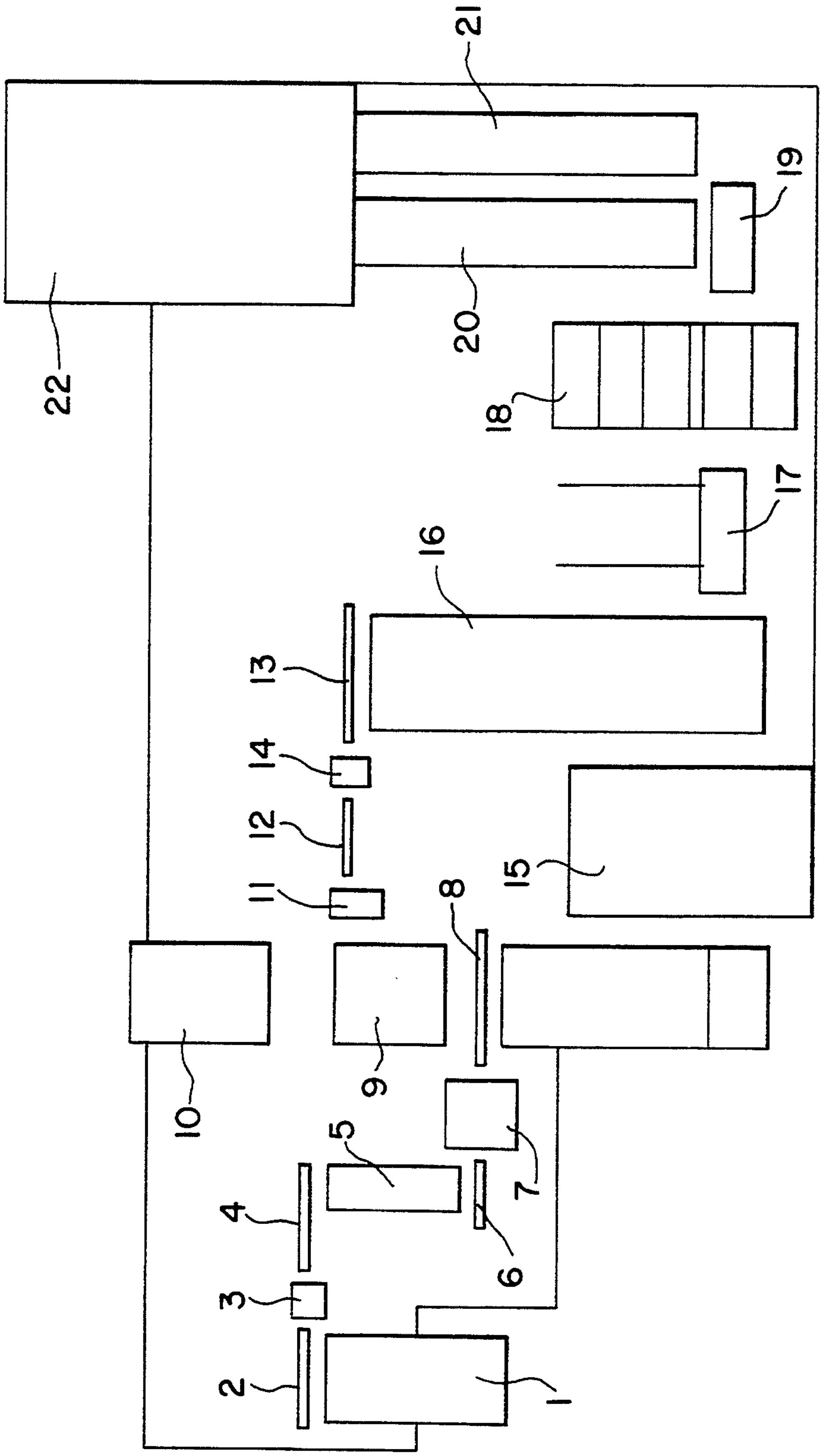

The present invention will be described in more detail with reference to the accompanying drawings in which FIG. 1 shows a block diagram of the installation, FIG. 2 shows the appearance of the timber in the various treating stations, and FIG. 3 illustrates a plan of how the various machines are arranged.

An untreated tree-trunk having a moisture content of approximately 30% is supplied to a saw 1. The stock is shown in FIG. 2 where it is designated 0. In a first station 1 the trunk is sawn into lengths designated 1*a*. The trunk is thereafter supplied to a station 2 and there sawn in such a manner that the lengths produced in station 1 are split lengthwise. The split lengths are designated 2*a*. The saw in station 1 may be a circular saw or a band saw. The saw in station 2 may be of the same type as that in station 1. The trunk is illustrated at 2*a* after two sawing processes. The sawn trunk designated 2*a* is composed of a number of similar units, two or more of which are joined together, glueing being performed first in station 3. A polyurethane type of glue is used for the purpose. The units to be glued are designated 3*a*. The units may also be turned in said glueing station so that the annual rings in the two units to be joined face away from each other. The glue is applied by spraying. The units glued together are supplied to a fourth station 4 functioning as a stacking station. In this station a number of layers of glued units are stacked one on top of the other. The procedure in the fourth station 4 is carried out in conventional manner. A stack is illustrated and designated 4*a*.

A stack is conveyed to a fifth station 5 where it is clamped together both from above and from the side. When the stack has been thoroughly compressed it is bandaged so that the compressed shape of the stack is retained. The bandaged stack is designated 5*a*.

The bandaged stack is supplied to a drying station 6. The drying station may be of the type described on page 91 of "General sawmill techniques" issued by the Employers' Federation of Swedish Forest Industries. The temperature in the drying station is over 60°. Drying should continue until a moisture content of approximately 10% has been reached. When a stack is bandaged the units in the stack are extremely flexible and can therefore be shaped to the correct shape. This correct shape is retained thanks to the bandaging. The glued units cannot become deformed during the drying process, and when they leave station 6, therefore, they are the correct shape without any sign of distortion, as is illustrated at 6*a*.

Contrary to known arrangements where it has been difficult to prevent distortion of the glued units, the installation described enables the production of undistorted glued units. This is achieved primarily through the use of the special glue mentioned above and the strong bandaging.

FIG. 3 shows the purely practical arrangement of a means according to the present invention. The designations used in the following description are independent of those used in the preceding figures. Thus in FIG. 3, 1 is a unit to receive timber. Said timber is conveyed to a debarker 3 by means of a supply conveyor 2. The debarker 3 cooperates with a feed-out conveyor 4 which carries the debarked timber to a transverse conveyor 5. Timber from said conveyor is supplied to a feed-in conveyor 6 which feeds the timber to a sawing machine 7. The sawing machine 7 cooperates with a feed-out conveyor 8 which supplies the timber to a sorter 9. From the sorter the timber is carried to a splitting machine 11. Split timber is then supplied by a conveyor 12 to a glue-supplying unit 14. The glued products are supplied by a conveyor 13 to a stacking device 16. The stacked timber is supplied to a sorting means 17. Stacked timber is compressed in a unit 18 and also bandaged. The bandaged timber is supplied to an elevator 19 and from there to one of the conveyors 20 and 21, both of which carry the bandaged timber to a dryer 22. A supply conveyor 10 is shown in the figure which can either supply timber which has not yet been debarked from unit 1 to the dryer 22 or supply dried timber from the dryer 22 to the unit 1.

We claim:

1. A method of forming a wood product comprising the steps of:

providing an elongate piece of lumber having a substantial moisture content;

sawing said piece into lengths;

sawing said lengths into elongate units;

applying adhesive to said units;

overlying said units in at least one group of at least two units with said adhesive therebetween;

banding said at least one group to preclude movement between said units thereof; and drying said at least one banded group of units to substantially reduce the moisture contents, wherein curing of said adhesive does not terminate until after said drying has begun.

2. The method of claim 1 wherein the step of overlying said units in at least one group comprises forming multiple groups of units, each group with adhesive between the units thereof, and stacking said multiple groups of units prior to banding; and said step of banding comprises banding said stack with said multiple groups therein.

3. The method of claim 2 wherein prior to overlying said units, said units are positioned with annual rings thereof oppositely directly.

4. The method of claim 3 wherein the step of applying adhesive to said units comprises applying adhesive curable in response to moisture reduction during the drying step.

5. The method of claim 4 wherein the step of providing an elongate piece of lumber comprises providing lumber with a moisture content of at least 30%.

6. The method of claim 5 wherein said drying of said lumber occurs at a temperature of at least 60° centigrade.

7. The method of claim 6 wherein said drying continues until a moisture content of approximately 10% is reached.

8. The method of claim 1 wherein the step of applying said glue comprises applying a polyurethane glue.

9. The method of claim 1 wherein the step of applying glue to said units comprises applying glue curable in response to moisture reduction during the drying step.

10. The method of claim 1 wherein the step of providing an elongate piece of lumber comprises providing lumber with a moisture content of at least 30%.

11. The method of claim 10 wherein said drying continues until a moisture content of approximately 10% is reached.

12. The method of claim 11 wherein said drying of said lumber occurs at a temperature of at least 60° centigrade.

13. A system of forming a multiple unit wood product from an elongate piece of lumber having a substantial moisture content, such system comprising:

multiple sequential stations; and transport means for moving lumber between said stations;

said multiple sequential stations individually comprising:

means for sawing said piece of lumber into lengths;

means for sawing said lengths into elongate units;

means for applying glue to said units;

means for stacking said units;

means for banding said stacked groups to preclude movement between the units of the individual groups; and means for drying said banded groups of units to substantially reduce the moisture content thereof and for curing said glue as said groups dry, wherein said transport means is capable of supplying banded groups to said means for drying prior to termination of curing of the adhesive.

14. The system of claim 13 wherein said glue is a polyurethane glue.

15. The system of claim 14 wherein said means for drying is capable of reducing the moisture content of lumber to about 10%.

16. The system of claim 15 wherein said means for drying produces a drying temperature of approximately 60° centigrade.

* * * * *